US009199632B2

(12) United States Patent
Terakawa et al.

(10) Patent No.: US 9,199,632 B2
(45) Date of Patent: Dec. 1, 2015

(54) CONTROL DEVICE FOR HYBRID VEHICLE

(71) Applicants: AISIN SEIKI KABUSHIKI KAISHA, Kariya (JP); MITSUBISHI JIDOSHA KOGYO KABUSHIKI KAISHA, Minato-ku (JP)

(72) Inventors: Tomomitsu Terakawa, Anjo (JP); Yasuhiro Hosoi, Chiryu (JP); Yuichiro Kitamura, Nagoya (JP); Yoshihide Suzuki, Toyoake (JP); Katsunori Ueda, Okazaki (JP); Shigeyuki Yoshida, Toyota (JP); Shunichi Hirao, Kyoto (JP)

(73) Assignees: AISIN SEIKI KABUSHIKI KAISHA, Kariya-Shi, Aichi-Ken (JP); MITSUBISHI JIDOSHA KOGYO KABUSHIKI KAISHA, Manato-Ku, Tokyo (JP)

( * ) Notice: Subject to any disclaimer, the term of this patent is extended or adjusted under 35 U.S.C. 154(b) by 241 days.

(21) Appl. No.: 13/628,932

(22) Filed: Sep. 27, 2012

(65) Prior Publication Data
US 2013/0079967 A1 Mar. 28, 2013

(30) Foreign Application Priority Data

Sep. 27, 2011 (JP) ................................. 2011-211332

(51) Int. Cl.
*B60L 9/00* (2006.01)
*B60L 11/00* (2006.01)
(Continued)

(52) U.S. Cl.
CPC .............. *B60W 20/00* (2013.01); *B60W 10/02* (2013.01); *B60W 10/06* (2013.01); *B60W 10/08* (2013.01);
(Continued)

(58) Field of Classification Search
CPC ........ B60H 1/004; B60H 1/3222; B60K 6/46; B60K 6/48; B60W 10/02; B60W 10/06; B60W 10/08; B60W 20/00; B60W 20/10; B60W 20/108; B60W 20/1088; B60W 20/40; B60W 30/18027
USPC ............. 701/22, 112, 101, 70; 180/65, 65.26; 123/179, 305, 491; 930/930
See application file for complete search history.

(56) References Cited

U.S. PATENT DOCUMENTS 8,000,885 B2 * 8/2011 Nakai ........................... 701/112
8,676,478 B2 * 3/2014 Nakai et al. ................... 701/112
(Continued)

FOREIGN PATENT DOCUMENTS

DE    10 2007 050 774 A1    4/2009
FR         2 928 600 A1    9/2009
(Continued)

OTHER PUBLICATIONS

European Search Report issued on Oct. 9, 2014, by the European Patent Office in corresponding European Patent Application No. 12185864. (6 pages).
(Continued)

*Primary Examiner* — Thomas G Black
*Assistant Examiner* — Sze-Hon Kong
(74) *Attorney, Agent, or Firm* — Buchanan Ingersoll & Rooney PC

(57) ABSTRACT

A control device for a hybrid vehicle includes a portion determining whether an engine torque is necessary, a portion controlling a motor to make a motor torque be a target torque, an engine rotation speed control portion controlling an engine output shaft to rotate at a target engine rotation speed for sudden start/reacceleration while the clutch being disengaged after starting the engine and before an actual rotation speed of the engine output shaft exceeds a reference target engine rotation speed in a case where the engine torque is necessary, a control portion engaging the clutch after the actual rotation speed exceeds the reference target engine rotation speed, and a portion controlling the engine so that the engine torque is assumed to be a target torque by canceling the control by the engine rotation speed control portion after the actual rotation speed exceeds the reference target engine rotation speed.

7 Claims, 8 Drawing Sheets

(51) Int. Cl.
  *G05D 1/00* (2006.01)
  *G06F 7/00* (2006.01)
  *G06F 17/00* (2006.01)
  *B60W 20/00* (2006.01)
  *B60W 10/02* (2006.01)
  *B60W 10/06* (2006.01)
  *B60W 10/08* (2006.01)
  *B60W 30/18* (2012.01)

(52) U.S. Cl.
  CPC ......... *B60W 20/40* (2013.01); *B60W 30/18027* (2013.01); *B60W 2510/0638* (2013.01); *B60W 2540/10* (2013.01); *B60W 2710/0644* (2013.01); *B60W 2710/0666* (2013.01); *B60W 2710/083* (2013.01); *Y02T 10/6286* (2013.01); *Y10S 903/93* (2013.01)
  USPC .......................... 701/22; 180/65.265; 903/930

(56) References Cited

U.S. PATENT DOCUMENTS

| | | | |
|---|---|---|---|
| 2007/0026993 A1 | 2/2007 | Kawamoto et al. | |
| 2008/0115986 A1 | 5/2008 | Rimaux et al. | |
| 2009/0312144 A1 | 12/2009 | Allgaier et al. | |
| 2010/0036590 A1* | 2/2010 | Nakai | 701/112 |
| 2010/0204908 A1* | 8/2010 | Nakai | 701/112 |
| 2010/0324762 A1 | 12/2010 | Imaseki et al. | |
| 2011/0203860 A1 | 8/2011 | Sauvlet et al. | |
| 2013/0079967 A1* | 3/2013 | Terakawa et al. | 701/22 |

FOREIGN PATENT DOCUMENTS

| | | | |
|---|---|---|---|
| JP | 2002-340172 A | | 11/2002 |
| JP | 2005-163856 A | | 6/2005 |
| JP | 2005-325804 A | | 11/2005 |
| JP | 2006-038057 A | | 2/2006 |
| JP | 2008-162315 A | | 7/2008 |
| JP | 2008-239063 A | | 10/2008 |
| JP | 2009-047269 A | | 3/2009 |
| JP | 2010-184613 A | | 8/2010 |
| JP | 2010184613 | * | 8/2010 |

OTHER PUBLICATIONS

Japanese Notification of Reasons for Rejection dated Jun. 30, 2015 issued in the corresponding Japanese Patent Application No. 2011-211332 and English translation (6 pages).

* cited by examiner

Target engine rotation speed

__US 9,199,632 B2__

CONTROL DEVICE FOR HYBRID VEHICLE

CROSS REFERENCE TO RELATED APPLICATIONS

This application is based on and claims priority under 35 U.S.C. §119 to Japanese Patent Application 2011-211332, filed on Sep. 27, 2011, the entire content of which is incorporated herein by reference.

TECHNICAL FIELD

This disclosure generally relates to a control device for a hybrid vehicle.

BACKGROUND DISCUSSION

A known control device for a hybrid vehicle is disclosed in JP2010-184613A (hereinafter referred to as Patent reference 1). Patent reference 1 discloses a hybrid vehicle which includes an internal combustion engine and an electric motor serving as a motor, a dual clutch transmission in which a second input shaft is engaged with a rotor of the electric motor, and an electronic control unit for the hybrid vehicle for controlling the internal combustion engine, the electric motor, and the dual clutch transmission cooperatively. According to the construction of the hybrid vehicle. In a case where a requested drive force requested by a driver cannot be achieved by a motor drive force during a vehicle drives in an electric motor drive mode, it is necessary to change modes from the electric motor drive mode to an engine drive mode or to a hybrid vehicle (HV) drive mode in which the internal combustion engine is applied as the motor. Namely, in a case where the requested drive force exceeds a maximum motor drive force, it is necessary to start operating the internal combustion engine to change the modes to the drive modes (to the engine drive mode or to the hybrid vehicle (HV) drive mode) in which the internal combustion engine is applied as the motor.

According to the control device for the hybrid vehicle disclosed in Patent reference 1, a control which, allows to start the vehicle or to accelerate the vehicle with high responsiveness in response to an operation of an accelerator by a driver when the drive mode is changed from the motor drive mode to the HV drive mode, for example, when starting the vehicle suddenly from a stopped state, and when accelerating the vehicle during coasting, or freewheeling, is requested.

A need thus exists for a control device for a hybrid vehicle which is not susceptible to the drawback mentioned above.

SUMMARY

In light of the foregoing, the disclosure provides a control device for a hybrid vehicle, which includes an automated transmission including an input shaft configured to be rotated by an engine torque outputted from an engine mounted to a vehicle, and an output shaft rotatably connected to a driving wheel of the vehicle for changing a rotation speed of the input shaft based on a gear ratio of plural gears for plural gear stages to transmit a rotation of the input shaft to the driving wheel, a clutch configured to engage and disengage an output shaft of the engine and the input shaft of the automated transmission at which an engaged state and a disengaged state are switched by an operation of a clutch actuator, a motor rotatably connected to the input shaft or the output shaft of the automated transmission for outputting a motor torque to the input shaft or the output shaft of the automated transmission, an accelerator pedal position sensor for detecting an operation amount of an accelerator pedal, an engine output shaft rotation speed detection sensor for detecting a rotation speed of the output shaft of the engine, an engine torque necessity determination portion determining whether an engine torque of the engine which is not outputted is necessary in addition to a motor torque of the motor when the accelerator pedal is operated, a motor torque control portion controlling the motor so that the motor torque of the motor is assumed to be a target torque during the accelerator pedal is operated, an engine rotation speed control portion controlling the engine so that a rotation speed of the output shaft of the engine is assumed to be a target engine rotation speed for sudden start/reacceleration which is set to be a value greater than a reference target engine rotation speed by a predetermined value while maintaining the clutch in the disengaged state after starting the engine and before an actual rotation speed of the output shaft of the engine exceeds the reference target engine rotation speed in a case where the engine torque necessity determination portion determines that the engine torque is necessary in addition to the motor torque, a clutch engagement control portion changing a state of the clutch from the disengaged state to the engaged state after the actual rotation speed of the output shaft of the engine exceeds the reference target engine rotation speed, and an engine torque control portion controlling the engine so that the engine torque of the engine is assumed to be a target torque by canceling the control by the engine rotation speed control portion after the actual rotation speed of the output shaft of the engine exceeds the reference target engine rotation speed.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

One embodiment of a control device for a hybrid vehicle will be explained with reference to illustrations of drawing figures as follows.

Figure 1:
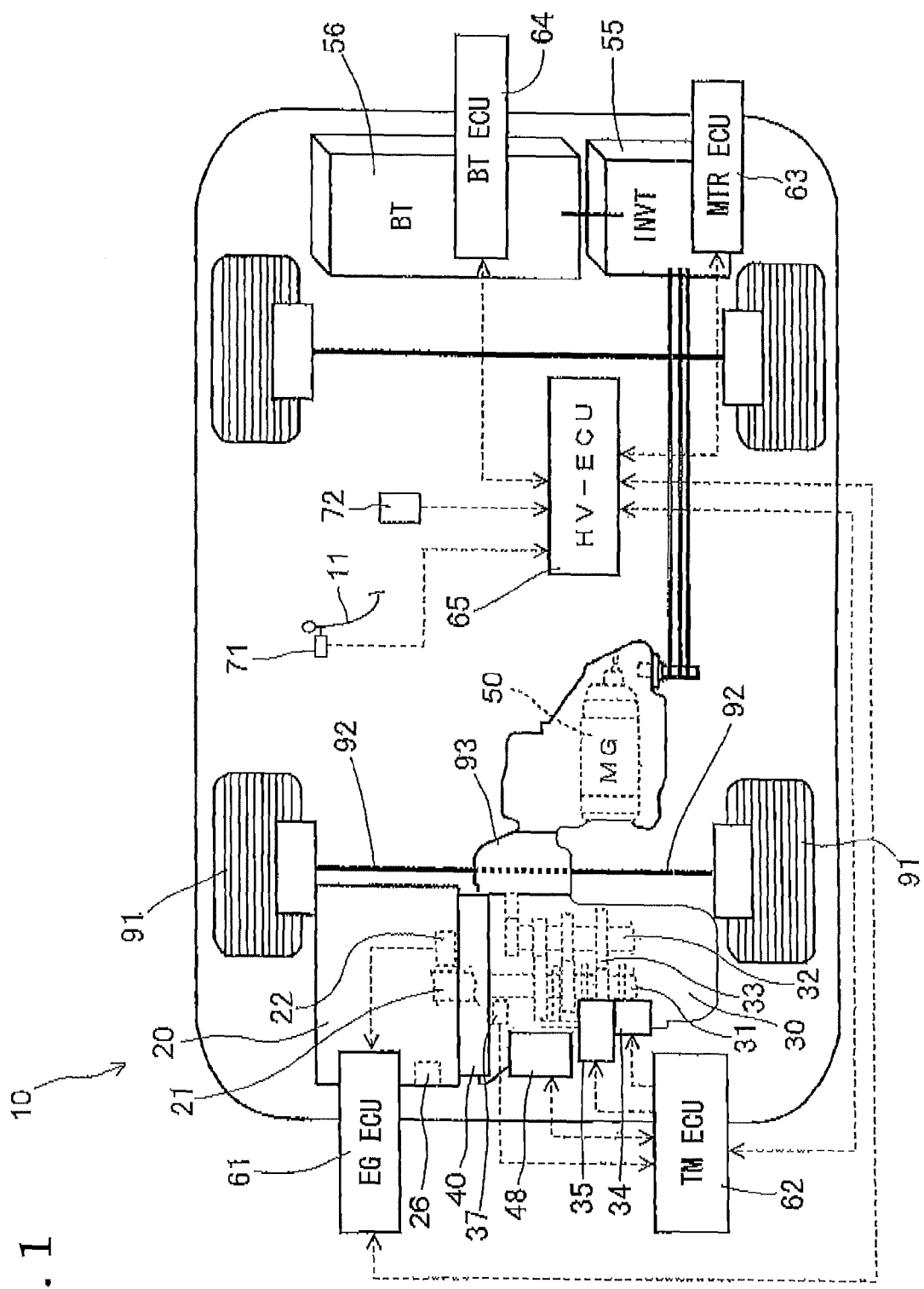
FIG. 1 is a schematic view of a device for a hybrid vehicle which is an object to be controlled by a control device according to an embodiment disclosed here.
Figure 2:
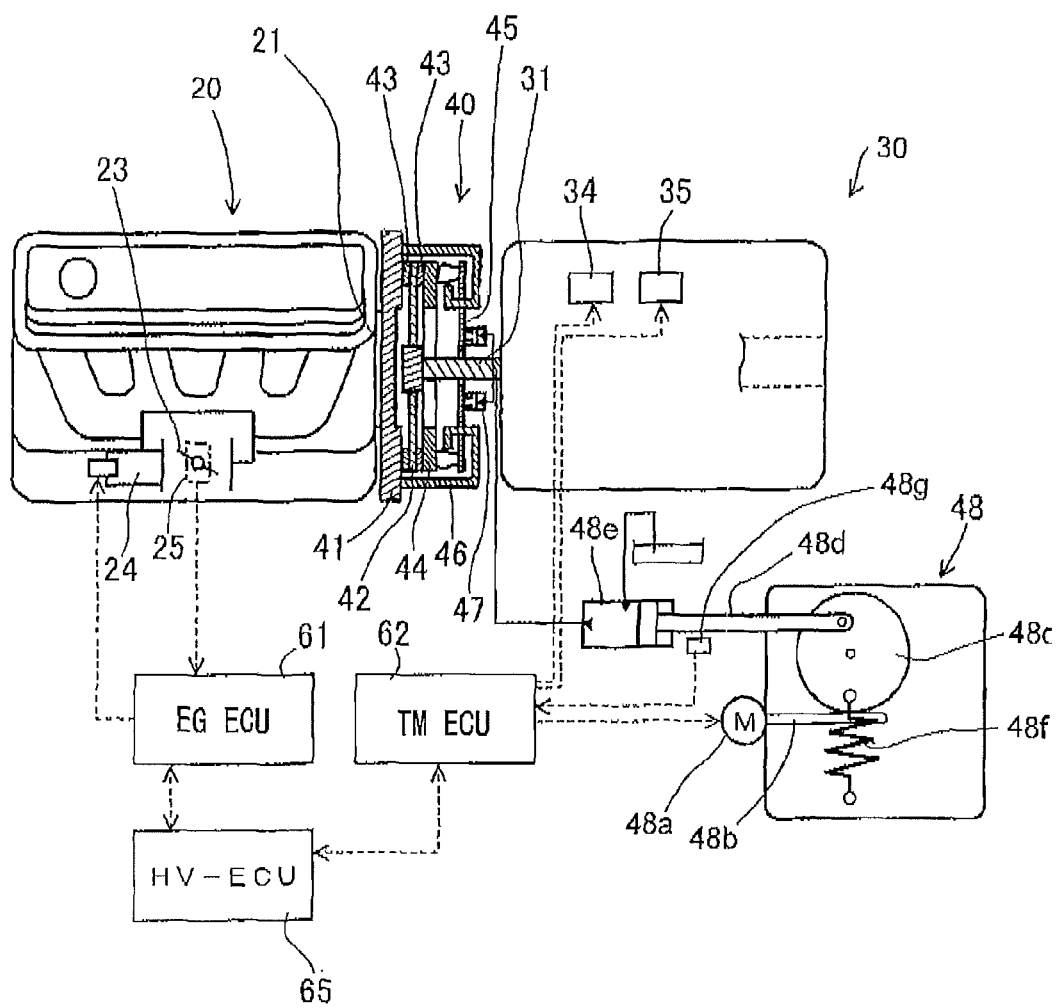
FIG. 2 is a schematic view of and engine, an automated transmission, and a clutch shown in FIG. 1 according to the embodiment disclosed here.

A control device for a hybrid vehicle 10 according to the embodiment will be explained referring to FIGS. 1 to 10. FIG. 1 shows a schematic view of the hybrid vehicle 10 which is an object to be controlled by the control device of the embodiment. In FIGS. 1 and 2, arrowed dotted lines show directions of control signals.

In the hybrid vehicle 10, an engine 20 and a motor generator (i.e., serving as a motor) 50 both serving as a driving source are arranged in parallel to driving front wheels 91 serving as a driving wheel, and the driving front wheels 91, 91 are driven by one of or both of the engine 20 and the motor generator 50. The hybrid vehicle 10 includes an automated transmission 30 and a clutch 40.

The hybrid vehicle 10 is a parallel type hybrid vehicle, in which the engine 20 and a motor generator 50 are connected to a differential mechanism 93 by separate shafts (i.e., via each output shaft). Alternatively, the engine 20 and the motor generator 50 may be arranged on the same shaft (i.e., on a common output shaft).

Constructions of the engine 20, the automated transmission 30, and the clutch 40 will be explained with reference to FIG. 2. As shown in FIG. 2, the engine 20, the clutch 40, and the automated transmission 30 are arranged in the mentioned order in a vehicle width direction, and the engine 20, the clutch 40, and the automated transmission 30 share a common rotational axis within a range from an output shaft 21 of the engine 20 to an input shaft 31 of the automated transmission 30. An engine rotation speed sensor (i.e., serving as an engine output shaft rotation speed detection sensor) 22, which is a non-contact sensor, for detecting a rotation speed (rotation number) of the output shaft 21 is provided in the vicinity of the output shaft 21 of the engine 20. The engine rotation speed sensor 22 serves as an engine output shaft rotation speed detection sensor for detecting the rotation speed (rotation number) of the output shaft 21 of the engine 20.

Further, as shown in FIG. 2, the engine 20 includes a throttle valve 23 for regulating, or adjusting an air intake amount, and an injector for regulating, or adjusting a fuel supply amount in association with the air intake amount. The engine 20 further includes an actuator 24 for throttle for regulating, or adjusting a throttle opening Slt of the throttle valve 23 and a throttle sensor 25 for detecting a degree of the throttle opening Slt (i.e., throttle opening degree Slt). The throttle valve 23 and the injector serve as an output control mechanism for controlling an engine torque Te outputted from the output shaft 21 of the engine 20.

The output of the engine 20 is transmitted to the driving front wheels 91 via the clutch 40, the automated transmission 30, the differential mechanism 93, and an axle 92.

The clutch 40 is a dry-type single plate friction clutch which is hydraulically operated. The clutch 40 is configured to engage and disengage the output shaft 21 of the engine 20 and the input shaft 31 of the automated transmission 30, and is configured to switch an engaged state and a disengaged state of the output shaft 21 of the engine 20 and the input shaft 31 of the automated transmission 30 by an operation of a clutch actuator (actuator) 48.

As shown in FIG. 2, the clutch 40 includes a flywheel 41, a clutch disc 42, a pressure plate 44, a diaphragm spring 45, a clutch cover 46, a concentric slave cylinder 47, and the clutch actuator 48. The flywheel 41 is formed in a thick disc shape having a mass for maintaining inertia, and is coaxially fixed to the output shaft 21 of the engine 20. The clutch cover 46 formed in a substantially cylindrical shape is provided on an outer peripheral portion of the flywheel 41 at a side opposite to the engine 20 to extend in an axial direction. A clutch disc 42 which is formed in a substantially disc shape is positioned within the clutch cover 46 to be adjoining to the flywheel 41. The clutch disc 42 is engaged with the input shaft 31 of the automated transmission 30 at a center portion thereof by means of a spline to integrally rotate with the input shaft 31. A clutch facing 43 is secured to opposing ends of outer peripheral portions of the clutch disc 42.

The substantially annular shaped pressure plate 44 is provided adjoining the clutch disc 42 to be reciprocating in an axial direction. The diaphragm spring 45 and the concentric slave cylinder 47 are configured to drive the pressure plate 44 (i.e., the diaphragm spring 45 and the concentric slave cylinder 47 are provided as a member for driving the pressure plate 44). Further, the clutch actuator 48 for operating the concentric slave cylinder 47 serves as a clutch drive mechanism. The clutch actuator 48 includes a direct current motor 48a, a speed reduction mechanism 48b with a worm gear, an output wheel 48c, an output rod 48d, a master cylinder 48e, an assist spring 48f, and a stroke sensor 48g.

Upon the rotational actuation of the direct current motor 48a of the clutch actuator 48, the output wheel 48c is rotated via the speed reduction mechanism 48b, and the output rod 48d moves forward (leftwards in FIG. 2) or rearward (rightwards in FIG. 2). Then, a hydraulic pressure is generated at the master cylinder 48e, the generated hydraulic pressure is transmitted to actuate the concentric slave cylinder 47 thus to actuate the pressure plate 44 in the axial direction via the diaphragm spring 45. The pressure plate 44 and the flywheel 41 sandwich the clutch disc 42 so that the pressure plate 44 presses the clutch disc 42. The pressure plate 44 is configured to change a pressure load of the clutch facing 43 of the clutch disc 42 slidably rotating relative to the flywheel 41. The assist spring 48f assists the output rod 48d to move in a forward direction. The stroke sensor 48g detects an operation amount Ma of the output rod 48d (i.e., an operation amount Ma of the actuator 48).

Figure 3:
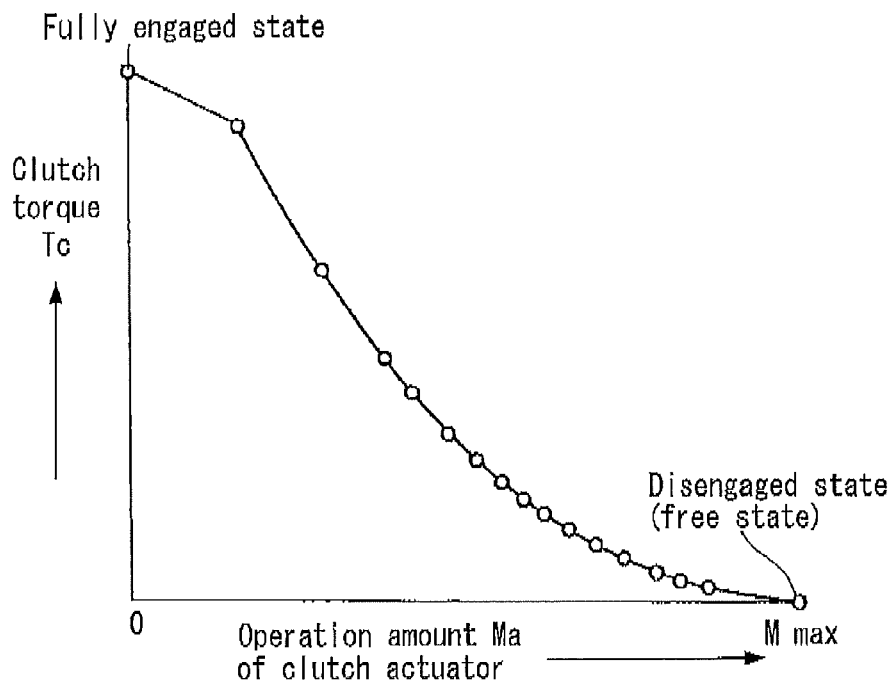
FIG. 3 shows a graph showing torque transmission characteristics of the clutch.

Accordingly, the clutch 40 is configured to switch an engaged state where the output shaft 21 of the engine 20 and the input shaft 31 of the automated transmission 30 are rotatably connected so that a clutch torque Tc is adjustable (so as to adjust a clutch torque Tc), and a disengaged state where the output shaft 21 of the engine 20 and the input shaft 31 of the automated transmission 30 are disengaged. FIG. 3 shows torque transmission characteristics of the clutch 40. A horizontal axis in FIG. 3 shows the operation amount Ma of the output rod 48d of the clutch actuator 48, and a vertical axis in FIG. 3 shows the transmissible clutch torque Tc. A normally connected type clutch, which is assumed to be a fully engaged state (fully connected state) where the clutch torque Tc is maximized when the operation amount Ma is zero (i.e., operation amount Ma=0), is applied as the clutch 40. With the clutch 40, in accordance with an increase in the operation amount Ma, the transmissible clutch torque Tc at a half engaged state (a half connected state) is reduced, and the clutch 40 is disengaged (i.e., a fully free state, or a disengaged state, or a disconnected state) when the operation amount Ma is assumed to be the maximum (i.e., operation amount Ma=Mmax).

An automated manual transmission (AMT) 30 in which a transmission for selectively engaging one of speed gears corresponding to plural speed stages of a gear train 33 by a shift lever operation by a driver is provided with actuators 34, 35 for automating a shift change operation is applied as the automated transmission 30. The automated transmission 30 includes the input shaft 31 rotated by an engine torque outputted from the engine 20 and an output shaft 32 rotatably connected to the driving wheels 91 of the vehicle for changing rotation speed of the input shaft 31 based on a gear ratio of the gear for the selected gear stage and transmitting the rotation to the driving wheels 91.

As indicated with dotted lines in FIG. 1, the automated transmission 30 includes a parallel axes gear meshing type structure which includes five forward speed ratios and one reverse speed ratio provided between the input shaft 31 and the output shaft 32 which are arranged in parallel to one another. The input shaft 31 is actuated to rotate by an engine torque outputted from the engine 20 via the clutch 40. A rotation speed sensor 37 for detecting an input rotation speed (input rotation number) of the input shaft 31 is provided in the vicinity of the input shaft 31. The rotation speed sensor 37 serves as an automated transmission input shaft rotation speed detection sensor for detecting a rotation speed (rotation number) of the input shaft 31 of the automated transmission 30. The output shaft 32 is engaged with an input side of the differential mechanism 93 positioned in a center in the vehicle width direction by means of a gear, and is rotatably connected to the driving front wheels 91 via the differential mechanism 93 and the axle 92.

Further, as shown in FIG. 2, the automated transmission 30 includes a select actuator 34 and a shift actuator 35. The select actuator 34 and a shift actuator 35 serve as a gear switching mechanism for selectively engaging one of gears for plural gear stages. The select actuator 34 is configured to select one of plural shift fork shafts, which are arranged in parallel with one another, of the automated transmission 30. More particularly, the select actuator 34 is configured to reciprocate an engaging portion detachably engaging with recessed portions formed on each of the shift fork shaft to move along an arranged (extended) direction of the shift fork shaft to engage the engaging portion with the recessed portion. Each of the shift fork shafts is connected to corresponding each sleeve (selectively engaged with one of two gears (e.g., either a first speed gear or a second speed gear)). An actuator for selectively engaging the shift fork shaft selected by reciprocating the engaging portion along an axial direction with a gear corresponding to a desired speed stage by moving the shift fork shaft in one of the axial directions is applied as the shift actuator 35.

A three-phase alternating current electrical rotating machine which is generally applied for a hybrid vehicle is applied as the motor generator 50. The motor generator 50 is rotatably connected to either the input shaft 31 or the output shaft 32 of the automated transmission 30 to output a motor torque to the input shaft 31 or the output shaft 32. According to the embodiment, an output shaft of the motor generator 50 is rotatably connected to an input side of the differential mechanism 93 via a reduction mechanism. Thus, the output shaft of the motor generator 50 is rotatably connected to the output shaft 32 of the automated transmission 30 and to the driving wheels 91.

An inverter (i.e., also referred to as INVT) 55 and a battery (i.e., also referred to as BT) 56 are mounted to the hybrid vehicle 10 for actuating the motor generator 50. The inverter 55 includes a direct current-alternating current converting function for converting a direct current electric power, which is outputted from the battery 56, into an alternating current electric power having variable frequency to be supplied to the motor generator 50, and an alternating current-direct current converting function for converting the alternating current electric power generated at the motor generator 50 to the direct current electric power to charge the battery 56. The battery 56 may be provided exclusive for driving the vehicle, or may be shared for other use.

When the alternating current electric power is supplied, the motor generator 50 serves as an electric motor to generate a motor torque Tm which can be added to the engine torque Te thus to drive the driving front wheels 91 by motor. The motor generator 50 serves as a power generator, or electric generator when the motor generator 50 is actuated by a power generation toque Tgen which corresponds to a part of the engine torque Te, where the battery 56 can be charged.

As shown in FIG. 1, the hybrid vehicle 10 includes an engine electronic control unit (engine ECU, also referred to as EG ECU) 61, a transmission electronic control unit (transmission ECU, also referred to as TM ECU) 62, a motor electronic control unit (motor ECU, referred to as MTR ECU) 63, and a battery electronic control unit (battery ECU, also referred to as BT ECU) 64. The hybrid vehicle 10 further includes a hybrid vehicle electronic control unit (hybrid vehicle ECU, also referred to as HV-ECU) 65 for controlling the hybrid vehicle 10 as a whole. Each of the engine ECU 61, the transmission ECU 62, the motor ECU 63, and the battery ECU 64 is connected to the HV-ECU 65, for example, via CAN to exchange the bilaterally necessary information, and is managed and controlled by the HV-ECU 65. Each of the engine ECU 61, the transmission ECU 62, the motor ECU 63, the battery ECU 64, and the HV-ECU 65 includes a CPU portion for executing an arithmetic processing, a memory portion, for example, a ROM and a RAM for storing a program and various maps, and an input-output portion for exchanging the information.

The engine ECU 61 actuates a starter 26 (see FIG. 1) in response to an operation of an ignition switch to start the engine 20. Further, the engine ECU 61 obtains a signal of an engine rotation speed Ne of the output shaft 21 from the engine rotation speed sensor 22 and obtains a signal of a throttle opening degree Slt from the throttle sensor 25. Then, the engine ECU 61 commands the actuator 24 for throttle to open and close the throttle valve 23 while monitoring the engine rotation speed Ne of the output shaft 21, and the engine ECU 61 controls the injector thus to control the engine torque Te and/or the engine rotation speed Ne. According to the embodiment, the engine rotation speed Ne is controlled not just based on an operation amount of an accelerator pedal 11 operated, or stepped on by a driver and the engine rotation speed Ne is controlled by a command from the HV-ECU 65 by priority to the operation of the accelerator pedal 11 by the driver.

The transmission ECU 62 executes a gear shift control by controlling the clutch 40 and the automated transmission 30 in association with each other. The transmission ECU 62 actuates the direct current motor 48a of the clutch actuator 48 to control a transmissible clutch torque Tc, and obtains a signal of the operation amount Ma of the output rod 48d from the stroke sensor 48g to recognize, or acquire the clutch torque Tc at the time. The transmission ECU 62 obtains an input rotation speed from the rotation speed sensor 37 of the automated transmission 30, and actuates the select actuator 34 and the shift actuator 35 to selectively engage one of the gear sets of the gear train 33 to control a change of gear stages.

Figure 4:
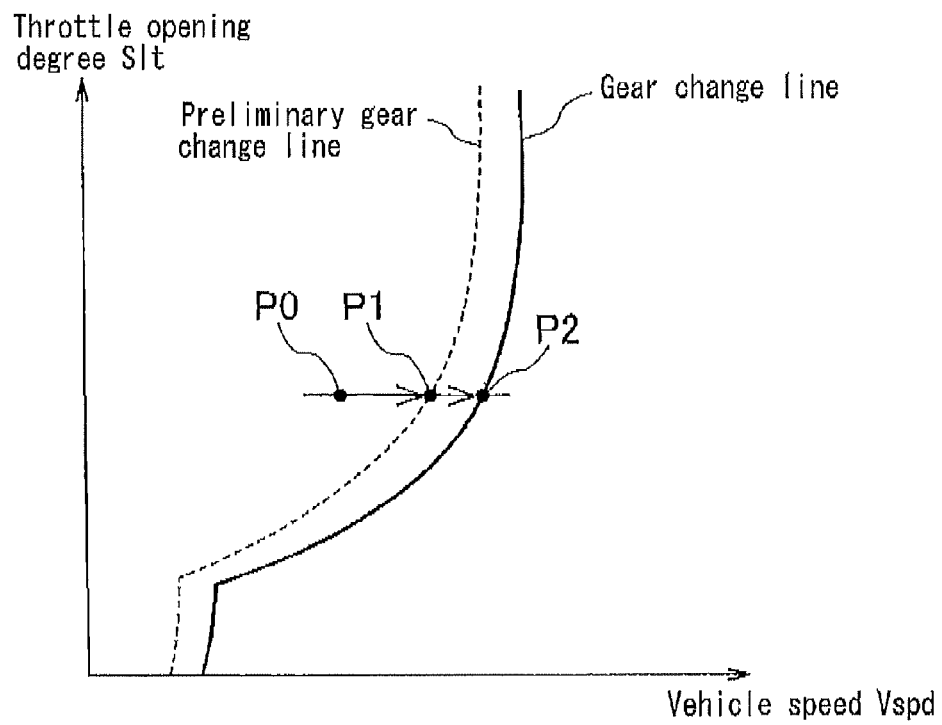
FIG. 4 shows a graph showing a preliminary gear change line and a gear change line of the automated transmission.

The transmission ECU 62 stores, or retains map data of a preliminary gear change line and a gear change line determined for each of gear stages (gear sets) of gear trains 33. FIG. 4 shows the preliminary gear change line and the gear change line of the automated transmission 30. In FIG. 4, a horizontal axis shows a vehicle speed Vspd, a vertical axis shows the throttle opening degree Slt of the throttle valve 23 of the engine 20, the preliminary gear change line during an upshift operation from a first speed to a second speed is indicated with a dotted line, and the gear change line is indicated with a solid line. As shown in FIG. 4, the preliminary gear change line and the gear change line have a curve in similar configuration, and the gear change line is positioned at a side having a higher vehicle speed Vspd compared to the preliminary gear change line.

As illustrated in FIG. 4, when a vehicle travels selecting first speed gear of the gear train 33 of the automated transmission 30 as indicted with point P0 and when the vehicle speed Vspd gradually increases to reach point P1 on the preliminary gear change line, the transmission ECU 62 determines that a preliminary gear shift condition is satisfied. When the vehicle speed Vspd further increases to reach point P2 on the gear change line, the transmission ECU 62 determines that a gearshift condition is satisfied. Namely, the fulfillment of the preliminary gear shift condition allows to presume that the gear shift condition is about to meet. In those circumstances, the fulfillment of the preliminary gear shift condition does not necessarily lead to satisfy the gear shift condition, and even if the preliminary gear shift condition is once satisfied, the preliminary gear shift condition may be dissolved, or canceled without the fulfillment of the gear shift condition.

The motor ECU 63 controls the inverter 55 to control an operation of the motor generator 50. For example, by controlling the inverter 55 to supply the alternating current electric power from the inverter 55 to the motor generator 50, the motor generator 50 functions as the electric motor to generate the motor torque Tm. The frequency of the alternating current electric power needs to be controlled to be a value which is in accordance with the rotation speed of the output shaft 32 of the automated transmission 30. Further, for example, by variably controlling a virtual value, or effective value of the alternating current electric power by a pulse width modulation control (PWM control), the level of the motor torque Tm may be regulated, or adjusted. Further, the motor ECU 63 is configured to control the inverter 55 to receive the alternating current electric power generated at the motor generator 50 so that the motor generator 50 serves as the power generator, or electric generator.

The battery ECU 64 manages a state of charge SOC of the battery 56. The information of the state of charge SOC is sent to the HV-ECU 65 and is referred to at various controls. In a case where the state of charge SOC declines or excessively increases, a control for swiftly regaining a favorable state is performed.

The HV-ECU 65 shares the information necessary among the engine ECU 61, the transmission ECU 62, the motor ECU 63, and the battery ECU 64 to control the hybrid vehicle 10 as a whole. The HV-ECU 65 obtains the information of an accelerator pedal operation amount, or the accelerator pedal position from an accelerator pedal position sensor 71, and obtains the information of the vehicle speed Vspd from a vehicle speed sensor 72. The accelerator pedal position sensor 71 is a sensor for detecting an operation amount, or stepped amount of the accelerator pedal 11 operated by a driver, that is, the accelerator pedal operation amount. A level of a drive torque required for the driving front wheels 91 for propelling, or traveling the vehicle is determined on the basis of the level of the accelerator pedal operation amount. Alternatively, a rotation speed sensor 37 may be applied as the vehicle speed sensor 72. Further, alternatively, a rotation speed sensor provided in the vicinity of vehicle wheels of the hybrid vehicle 10 for detecting a rotation speed of the vehicle wheels may be applied as the vehicle speed sensor 72.

An operation of the control device for the hybrid vehicle will be explained with reference to a flowchart shown in FIGS. 5A and 5B. The HV-ECU 65 executes a program corresponding to the flowchart repeatedly every predetermined time when a start switch is in an ON state. The HV-ECU 65 determines whether the vehicle is in a drive mode allowing vehicle drive only by motor every time the HV-ECU 65 starts executing the program at Step 100 in FIG. 5A (Step 102). That is, the HV-ECU 65 determines whether the vehicle is in a drive mode allowing vehicle drive only by motor in which the clutch 40 is disengaged and power is transmissible only between the motor generator 50 and the driving wheels 91 (drive mode determination means, or drive mode determination portion).

Namely, the HV-ECU 65 determines that the vehicle is in the drive mode allowing vehicle drive only by motor in a case where the clutch 40 is disengaged and the power is transmissible only between the motor generator 50 and the driving wheels 91, and the HV-ECU 65 determines that the vehicle is not in the drive mode allowing vehicle drive only by motor if that is not the case.

Whether the clutch 40 is disengaged may be determined on the basis of an output signal from the stroke sensor 40g of the clutch actuator 40, or may be determined on the basis of a control command from the HV-ECU 65 (or the transmission ECU 62). Whether the power is transmissible only between the motor generator 50 and the driving wheels 91 may be determined, for example, on the basis of the state of charge SOC of the battery 56.

Particularly, for example, a case where the vehicle in a stopped state starts running suddenly, a case where the vehicle is accelerated during coasting, or freewheeling at high speed (during regenerative braking), and a case where the vehicle is accelerated during running at low speed only by a drive force of the motor generator 50 are examples of a case that the power is transmissible only between the motor generator 50 and the driving wheels 91 (transmissible state).

In a case where the vehicle in a stopped state starts running suddenly, the clutch 40 is in a disengaged state (free state) before stepping on, or operating an accelerator pedal 11, and the power is transmissible only between the motor generator 50 and the driving wheels 91 because the clutch 40 is in the disengaged state.

Further, in a case where the vehicle in coasting, or freewheeling (during the regenerative braking) is accelerated (i.e., reaccelerated), the clutch 40 is in the disengaged state immediately before further stepping on (further operating) the accelerator pedal 11, and the power is transmissible only between the motor generator 50 and the driving wheels 91 because the clutch 40 is in the disengaged state and the power of the driving wheels 91 is transmitted to the motor generator 50 to generate the electric power. This state is included in the transmissible state.

Further, in a case where the vehicle is accelerated (i.e., reaccelerated) during running at low speed only by a drive force of the motor generator 50, the clutch 40 is in a disengaged state immediately before further stepping on (further operating) the accelerator pedal 11, and the power is transmissible only between the motor generator 50 and the driving wheels 91 because the clutch 40 is in the disengaged state and the only the drive force of the motor generator 50 is transmitted to the driving wheels 91. This state is included in the transmissible state.

Figure 5A:
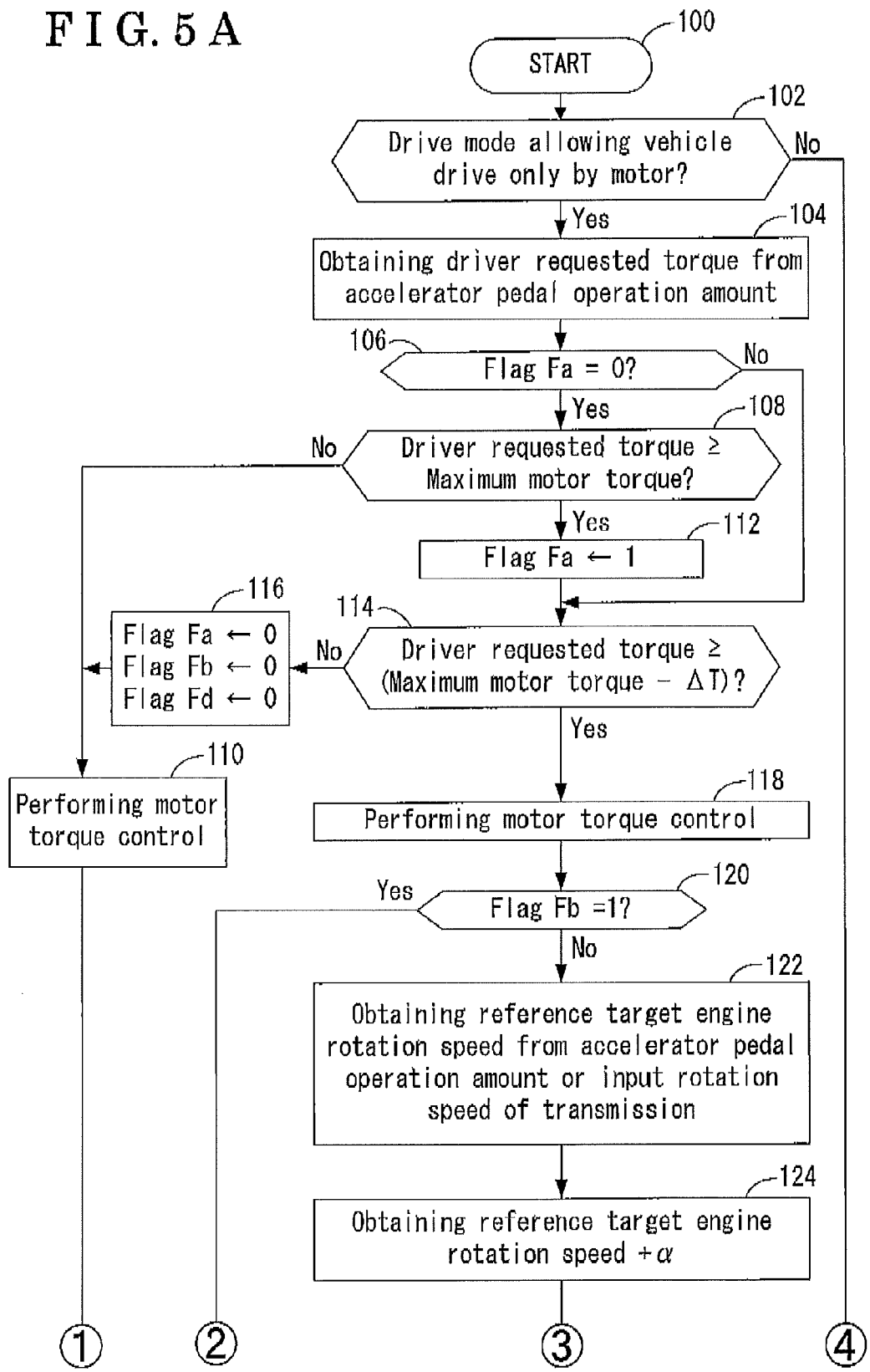
FIG. 5A is a flowchart for a control program executed by a hybrid vehicle electronic control unit (HV-ECU) shown in FIG. 1.
Figure 5B:
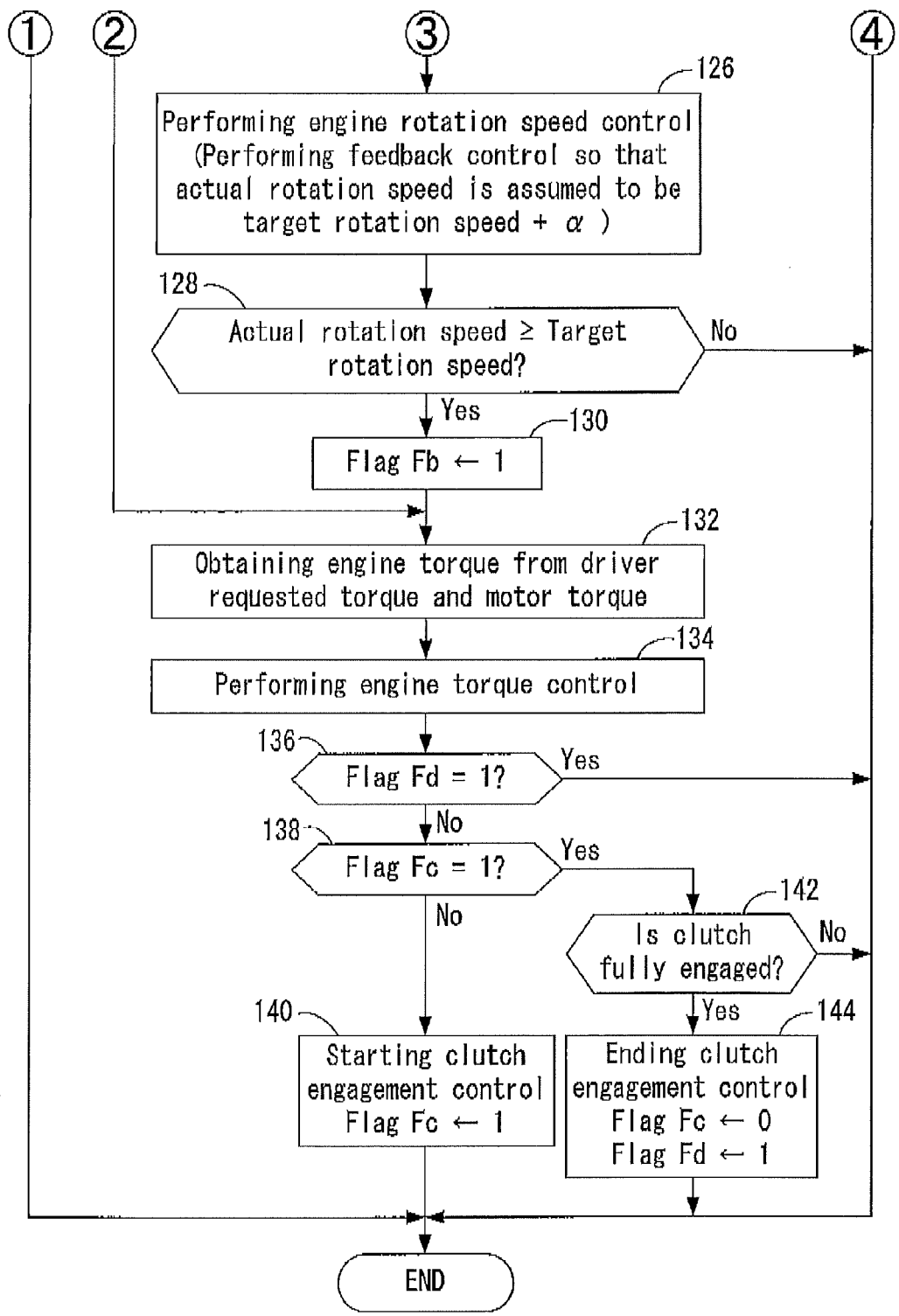
FIG. 5B is the flowchart continuing from FIG. 5A for the control program executed by the hybrid vehicle electronic control unit (HV-ECU) shown in FIG. 1.

Thus, the HV-ECU 65 ends the program following the flowchart in FIGS. 5A and 5B in a case where it is determined that the vehicle is not in the drive mode allowing vehicle drive only by motor. Particularly, for example, the HV-ECU 65 prohibits the driving of the vehicle by the drive force of the motor generator 50 and drives the vehicle by the drive force of the engine 20.

On the other hand, in a case where it is determined that the vehicle is in the drive mode allowing vehicle drive only by motor, the HV-ECU 65 drives the vehicle only by the drive force of the motor generator 50, or the HV-ECU 65 drives the vehicle by the drive force of the motor generator 50 and the engine 20.

The HV-ECU 65 obtains a driver requested torque from the accelerator pedal operation amount of the accelerator pedal 11 (Step 104). The HV-ECU 65 obtains the accelerator pedal operation amount from the accelerator pedal position sensor 71. The HV-ECU 65 obtains the driver requested torque from the obtained accelerator pedal operation amount and a map which is pre-stored. The driver requested torque is a drive torque which is necessary to be generated at the driving wheels 91 in order to propel, or driving the vehicle.

Figure 6:
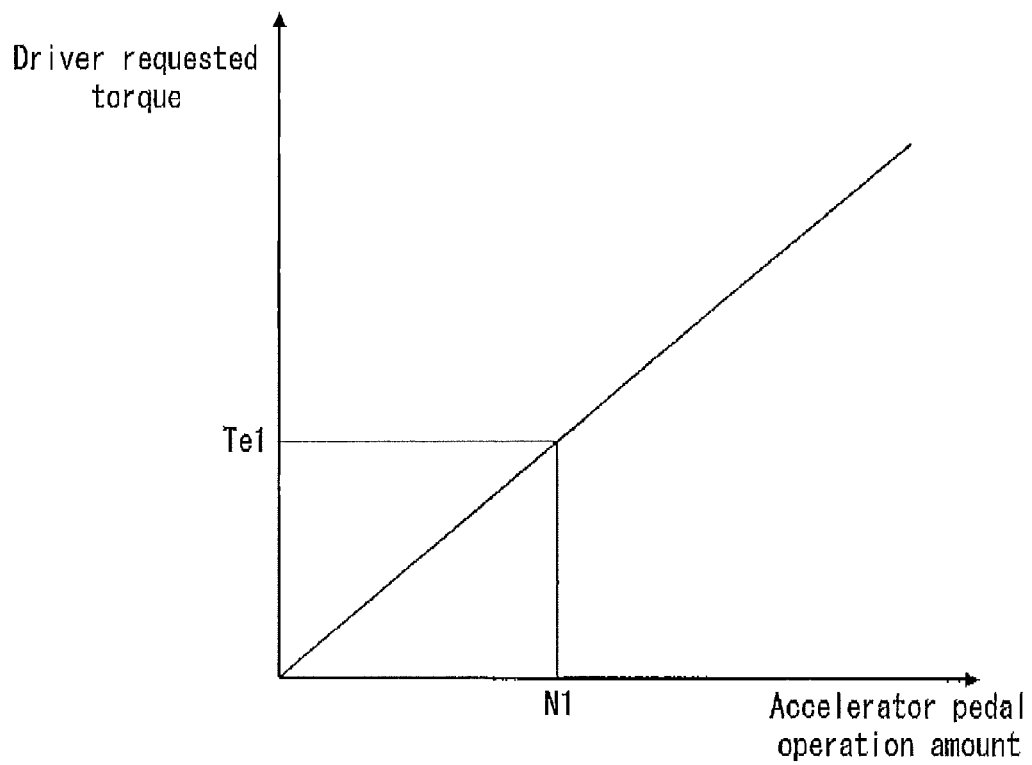
FIG. 6 shows a map illustrating a correlation between an accelerator pedal operation amount and a driver requested torque.

As shown in FIG. 6, the map shows a correlation between the accelerator pedal operation amount and the driver requested torque. The map shows the correlation that the greater the accelerator pedal operation amount becomes, the greater the driver requested torque becomes. The driver requested torque may be calculated based on not only the accelerator pedal position (accelerator pedal operation amount) but also the vehicle speed as an argument.

Next, the HV-ECU 65 determines whether a flag Fa is zero (0) (Step 106). The flag Fa shows whether the vehicle is in a motor drive mode or in a hybrid drive mode. When the flag Fa shows zero (0), the vehicle is in a motor drive mode. When the flag Fa shows one (1), the vehicle is in a hybrid drive mode. In those circumstances, when the vehicle is not in the hybrid drive mode after the start switch is turned on, the flag Fa remains zero (0), and the transaction is advanced to Step 108.

At Step 108, the HV-ECU 65 determines whether the driver requested torque obtained at Step 104 in advance is assumed to be equal to or greater than a maximum motor torque which is a maximum torque that the motor generator 50 is capable of outputting in accordance with a level of the vehicle speed. The HV-ECU 65 determines whether the driver requested torque can be achieved only with the motor torque of the motor generator 50.

Figure 7:
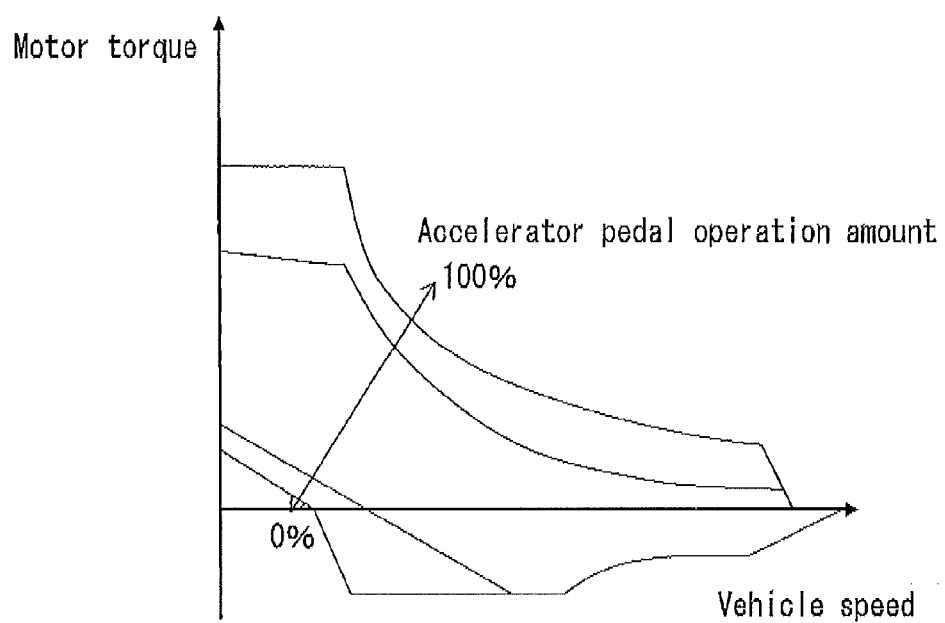
FIG. 7 shows a map illustrating a correlation between a vehicle speed for each of the accelerator pedal operation amount and a motor torque.

As shown in FIG. 7, the maximum motor torque is assumed to have a constant value when the vehicle speed (rotation speed of the output shaft) is from zero (0) to a predetermined level (predetermined vehicle speed, or predetermined rotation speed of the output shaft). When the level of the vehicle speed is greater than the predetermined level, the motor torque becomes smaller as the vehicle speed (the rotation speed of the output shaft) becomes greater. The motor torque changes in response to the level of the accelerator pedal operation amount. In a case where the motor torque shows a negative value, a regenerative control is performed at the motor generator 50.

That is, the HV-ECU 65 can determine whether an engine torque of the engine 20 which is not outputted at that moment (which has not been outputted) is necessary in addition to the motor torque by the motor generator 50 when the accelerator pedal 11 is stepped on, or operated (engine torque necessity determination means, or engine torque necessity determination portion; Step 108). Further, the engine torque necessity determination means is configured to determine whether the engine torque of the engine 20 is required in a case where it is determined that the vehicle travels in the drive mode allowing vehicle drive only by motor by the drive mode determination means (Step 102).

When the engine torque is not necessary, the HV-ECU 65 forwards the transaction to Step 110, after determining that the driver requested torque is not equal to or greater than the maximum motor torque at Step 108, to perform a torque control of the motor generator 50. For example, in a case where the hybrid vehicle is in the motor drive mode in which the hybrid vehicle is driven only by the motor drive, or drive force of the motor, the HV-ECU 65 controls the motor generator 50 on the basis of the map shown in FIG. 7. That is, the HV-ECU 65 obtains a target torque on the basis of the map by applying the detected accelerator pedal operation amount and the detected vehicle speed, and controls the motor generator 50 so that the motor torque of the motor generator 50 is assumed to be the obtained target torque (motor torque control means, or motor torque control portion). In order to make the vehicle creep, in which the vehicle travels forwards or backwards at very low speed without the operation of the accelerator pedal 11, a motor torque (creep torque) may be generated at the motor generator 50.

On the other hand, when the engine torque is necessary, the HV-ECU 65 forwards the transaction of the program to Step 112 to perform a torque control of the motor generator 50 and a control (either rotation speed control or a torque control) of the engine 20. In those circumstances, the hybrid vehicle is in a mode (hybrid drive mode) in which the drive force from both of the motor generator 50 and the engine 20 is transmitted to the driving wheels 91.

In Step 112, the HV-ECU 65 sets the flag Fa to indicate one (1) because the vehicle is in the hybrid drive mode. In Step 114, the HV-ECU 65 restrains the influence of hysteresis. Hysteresis shows the influence to an output value of an actually outputted torque relative to the driver requested torque during an increment or decrement process of the torque. Namely, in a case where the driver requested torque is assumed to be smaller than a level of the torque subtracting $\Delta T$ from the maximum motor torque (i.e., maximum motor torque—$\Delta T$), it is not necessary to add the engine torque, thus the flag Fa, a flag Fb, and a flag Fd are set to be zero (0) (i.e., reset) at Step 116, then the program is advanced to Step 110 to perform the torque control of the motor generator 50.

The $\Delta T$ is set to have a value for restraining the influence on the output value of an actually outputted torque relative to the driver requested torque during the increment or decrement process of the torque as much as possible and for properly performing the controls of the motor generator 50 and the engine 20.

The HV-ECU 65 continues the hybrid drive mode in a case where the driver requested torque is equal to or greater than the level of the torque subtracting $\Delta T$ from the maximum motor torque (i.e., maximum motor torque—$\Delta T$) after setting the flag Fa to one (1) until the flag Fa being reset to be zero (0).

Particularly, the HV-ECU 65 performs the torque control to the motor generator 50 (Step 118), and performs the torque control after performing a rotation speed control to the engine 20.

First, the HV-ECU 65 controls the motor generator 50 on the basis of the map shown in FIG. 7. That is, the HV-ECU 65 obtains the target torque on the basis of the map using the detected accelerator pedal operation amount and the detected vehicle speed, and controls the motor generator 50 so that the motor torque of the motor generator 50 is assumed to be the obtained target torque at Step 118 (motor torque control means, or motor torque control portion).

Then, in a case where the engine torque necessity determination means determines that the engine torque is required at Step 108, the HV-ECU 65 starts the engine 20 and controls the engine 20 while maintaining the disengaged state of the clutch 40 after the start of the engine 20 before an actual rotation speed of the output shaft 21 of the engine 20 exceeds a reference target engine rotation speed, so that the rotation speed of the output shaft 21 of the engine 20 is assumed to be a target engine rotation speed for sudden start/re-acceleration which is determined to be a value greater than the reference target engine rotation speed by a predetermined value (engine rotation speed control means, or engine rotation speed control portion).

Particularly, the HV-ECU 65 determines whether the flag Fb is one (1) at Step 120. The flag Fb indicates whether the engine 20 is controlled by the rotation speed control or the engine 20 is controlled by the torque control. When the flag Fb is zero (0), the engine 20 is controlled by the rotation speed control. When the flag Fb is one (1), the engine 20 is controlled by the torque control. In those circumstances, in a case where the rotation speed control of the engine 20 is not performed after the start switch is turned on, the flag Fb maintains one (1) (YES at Step 120).

The HV-ECU 65 obtains a target engine rotation speed based on accelerator pedal operation amount or from the rotation speed of the input shaft 31 of the automated transmission 30 (input rotation speed of the transmission) at Step 122. Particularly, the HV-ECU 65 obtains the accelerator pedal operation amount, that is, a stepped amount, or operation amount of the accelerator pedal 11 from the accelerator pedal position sensor 71, and obtains the target engine rotation speed based on accelerator pedal operation amount on the basis of the obtained accelerator pedal operation amount and a pre-stored map.

Figure 8:
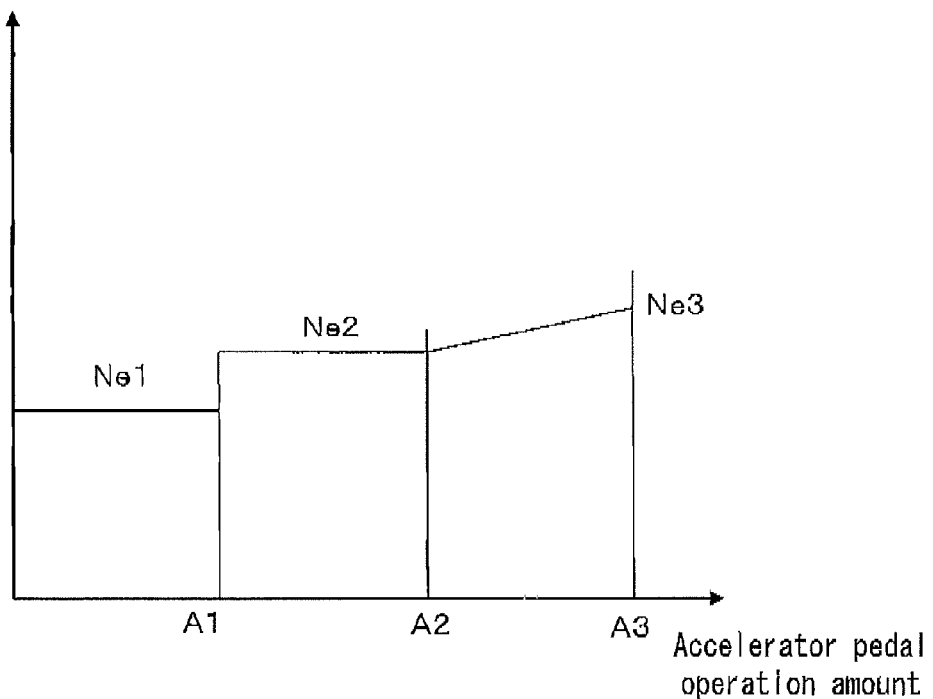
FIG. 8 shows a map illustrating a correlation between the accelerator pedal operation amount and a target engine rotation speed.

As shown in FIG. 8, the map shows a correlation between the accelerator pedal operation amount and the target engine rotation speed. According to the map shown in FIG. 8, the target engine rotation speed Ne1 is constant in a range from zero (0) to A1 of the accelerator pedal operation amount, the target engine rotation speed Ne2, which is a greater value than Ne1, is constant in a range from A1 to A2 of the accelerator pedal operation amount, and the target engine rotation speed is set to gradually increase from Ne2 to Ne3, which is defined to be greater than Ne2, in a range from A2 to A3 of the accelerator pedal operation amount.

The HV-ECU 65 obtains a target engine rotation speed based on the rotation speed of the input shaft 31 of the automated transmission 30 (i.e., a target engine rotation speed based on automated transmission input shaft rotation speed) detected by the rotation speed sensor 37 serving as an automated transmission input shaft rotation speed detection sensor. That is, the HV-ECU 65 obtains the rotation speed of the input shaft 31 of the automated transmission 30 from the rotation speed sensor 37 serving as the automated transmission input shaft rotation speed detection sensor and adds a predetermined rotation speed (e.g., 200 rpm) to the rotation speed of the input shaft 31 of the automated transmission 30 to obtain the target engine rotation speed based on the automated transmission input shaft rotation speed.

The HV-ECU 65 obtains a greater one of the target engine rotation speed based on the accelerator pedal operation amount and the target engine rotation speed based on the automated transmission input shaft rotation speed as a reference target engine rotation speed. The reference target engine rotation speed is applied as a reference value for the target engine rotation speed for sudden start/re-acceleration.

Next, the HV-ECU 65 obtains a value obtained by adding a predetermined value α to the obtained reference target engine rotation speed as the target engine rotation speed for sudden start/re-acceleration (i.e., obtaining the reference target engine rotation speed+α) at Step 124. The predetermined value α is set on the basis of the operation amount, or the stepping amount of the accelerator pedal 11. Then, the HV-ECU 65 performs the rotation speed control of the engine 20 (engine rotation speed control) at Step 126 (i.e., performing a feedback control so that the actual rotation speed is assumed to be the target rotation speed+α). That is, the HV-ECU 65 performs a feedback control so that the rotation speed of the engine 20 is assumed to be the target engine rotation speed for sudden start/re-acceleration which is obtained in advance. The HV-ECU 65 starts the engine 20 by the starter 26 prior to performing the rotation speed control of the engine 20.

The HV-ECU 65 obtains the engine rotation speed of the output shaft 21 from the engine rotation speed sensor 22 at Step 128, and determines whether the actual rotation speed of the output shaft 21 of the engine 20 exceeds the reference target engine rotation speed. The HV-ECU 65 determines that the actual rotation speed is not equal to or greater than the target rotation speed (NO at Step 128) until the actual rotation speed of the output shaft 21 of the engine 20 exceeds the reference target engine rotation speed, and continuously executes the engine rotation speed control (transactions in Step 122 to 128).

On the other hand, after the actual rotation speed of the output shaft 21 of the engine 20 exceeds the reference target engine rotation speed, the HV-ECU 65 stops the engine rotation speed control, and performs the engine toque control for controlling the engine 20 so that the engine torque of the engine 20 is assumed to be the target torque (engine torque control means, or engine torque control portion).

When the actual rotation speed of the output shaft 21 of the engine 20 exceeds the reference target engine rotation speed (YES at Step 128), the HV-ECU 65 advances the program to Step 130 to set the flag Fb at one (1). Thus, the HV-ECU 65 determines that the flag Fb is equal to one (i.e., flag Fb=1) (YES at Step 120) at the next control cycle, and skips the transaction of Steps 122 to 128 to advance the program to Step 132, thus canceling the engine rotation speed control. That is, the HV-ECU 65 switches the engine rotation speed control to the engine torque control when the actual rotation speed of the output shaft 21 of the engine 20 exceeds the reference target engine rotation speed.

The HV-ECU 65 obtains the engine torque based on the driver requested torque obtained at Step 104 in advance and the motor torque obtained at Step 118 in advance. For example, the engine torque is obtained by subtracting the motor torque from the driver requested torque. The obtained engine torque corresponds to the target torque.

The HV-ECU 65 controls the engine 20 so that the engine torque of the engine 20 is assumed to be the target torque at Step 134. Particularly, the HV-ECU 65 obtains the accelerator pedal operation amount, that is, the operation amount, or stepped amount of the accelerator pedal 11 from the accelerator pedal position sensor 71, and obtains the target engine rotation speed based on the obtained accelerator pedal operation amount, the target torque of the engine 20 which is obtained at Step 132 in advance, and a map (shown in FIG. 9) which is pre-stored.

Figure 9:
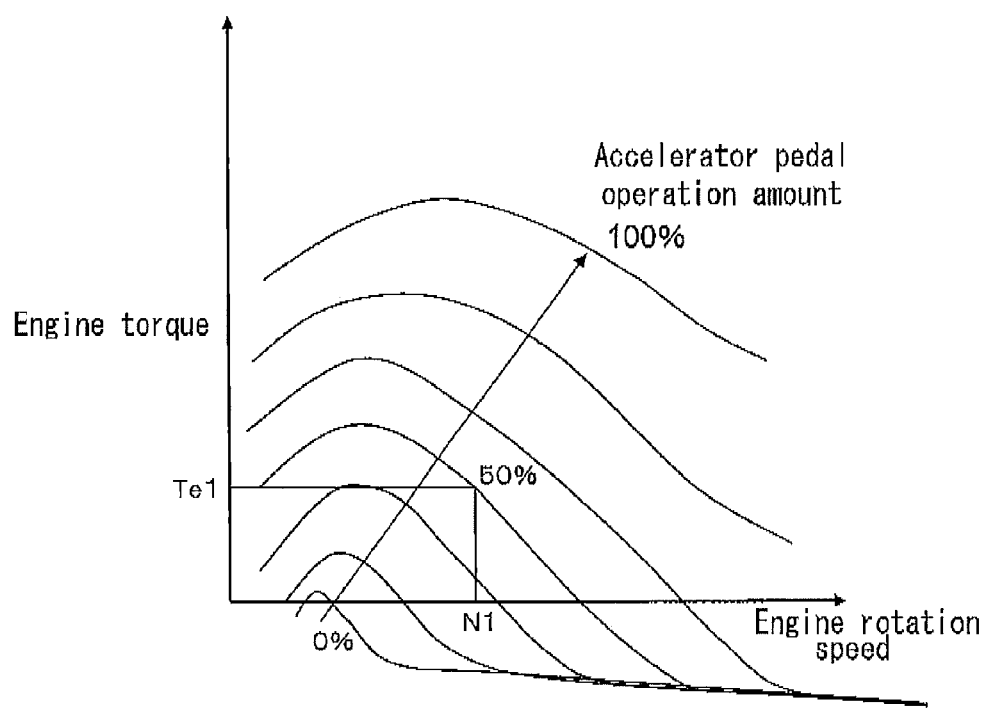
FIG. 9 shows a map illustrating a correlation between the engine rotation speed for each level of the accelerator pedal operation amount and an engine torque.

As shown in FIG. 9, the map shows a correlation between the engine rotation speed at each accelerator pedal operation amount (accelerator pedal position) and the engine torque.

The greater the accelerator pedal operation amount is, the greater the engine torque is. For example, when the target torque of the engine 20 is Te1 and the accelerator pedal operation amount is 50%, the target engine rotation speed is N1. The HV-ECU 65 performs the torque control of the engine 20 (engine torque control) by controlling the rotation speed of the engine 20 so that the rotation speed of the engine 20 is assumed to be the obtained target engine rotation speed.

After the actual rotation speed of the output shaft 21 of the engine 20 exceeds the reference target engine rotation speed, the HV-ECU 65 changes the states of the clutch 40 from the disengaged state to the engaged state (clutch engagement control means, or clutch engagement control portion) while performing the torque control of the engine 20.

The HV-ECU 65 determines whether the flag Fd is one (1) at Step 136. The flag Fd indicates whether the clutch engagement control is completed. When the flag Fd is zero (0), the clutch engagement control is not completed, whereas the clutch engagement control is completed when the flag Fd is one (1). In those circumstances, in a case where the clutch engagement control is not completed after the start switch is turned on, the flag Fd maintains zero (0) (NO at Step 136).

Further, the HV-ECU 65 determines whether the flag Fc is equal to one (1) at Step 138. The flag Fc indicates whether the clutch engagement control is started. When the flag Fc is zero, the clutch engagement control is not started. When the flag Fc is one (1), the clutch engagement control is started. In those circumstances, in a case where the clutch engagement control is not started after the start switch is turned on, the flag Fc maintains zero (0) (NO at Step 138).

When determining that flag Fd is not equal to one (1) (i.e., flag Fd≠1) at Step 136, and the flag Fc is not equal to one (1) (i.e., flag Fc≠1) at Step 138 (i.e., NO at Steps 136 and 138), the HV-ECU 65 starts the clutch engagement control at Step 140 and sets the flag Fc to be one (1). Thus, the HV-ECU 65 determines that the flag Fc is equal to one (1) (i.e., flag Fc=1) (YES at Step 138) at the next control cycle, then advances the transaction of the program to Step 142 without the execution of Step 140 to continue the clutch engagement control until the clutch 40 is fully engaged. In this case, the clutch control is not defined to control the clutch torque. The clutch control is defined as a control for actuating the direct current motor 48a of the clutch actuator 48 to move the output rod 48d in a rightward direction in FIG. 2. Accordingly, the clutch 40 in the disengaged state can be fully engaged in a short period.

The HV-ECU 65 determines whether the clutch 40 is fully engaged at Step 142. Particularly, the HV-ECU 65 determines whether the clutch 40 is fully engaged on the basis of an output signal from the stroke sensor 48g of the clutch actuator 48. The HV-ECU 65 determines that the clutch is not fully engaged until the clutch 40 is fully engaged at Step 142 (NO at Step 142). On the other hand, when the clutch 40 is fully engaged (I.e., YES at Step 142), the transaction is advanced to Step 144 where the HV-ECU 65 ends the clutch engagement control, sets the flag Fc to be zero (0), and sets the flag Fd to be one (1). Thus, the HV-ECU 65 determines that the flag Fd is equal to one (1) (I.e., Fd=1) at Step 136 (i.e., YES at Step 136) to end the program without transactions of Steps 138, 142, and 144.

Accordingly, after the actual rotation speed of the output shaft 21 of the engine 20 exceeds the reference target engine rotation speed, the control modes are switched from the engine rotation speed control to the engine torque control, and after the clutch 40 is fully engaged, the HV-ECU 65 controls the vehicle drive by the drive force of both of the motor generator 50 and the engine 20 at the hybrid drive mode until the drive mode of the vehicle is switched to the motor drive mode.

Because a level of each of the drive torques, that is, a level of each of the driver requested torque, the engine torque, and the motor torque, changes depending on, for example, a gear ratio between the input shaft 31 of the automated transmission 30 and the output shaft 32, the drive torque is converted into a torque at the position of the output shaft 21 of the engine 20.

Figure 10:
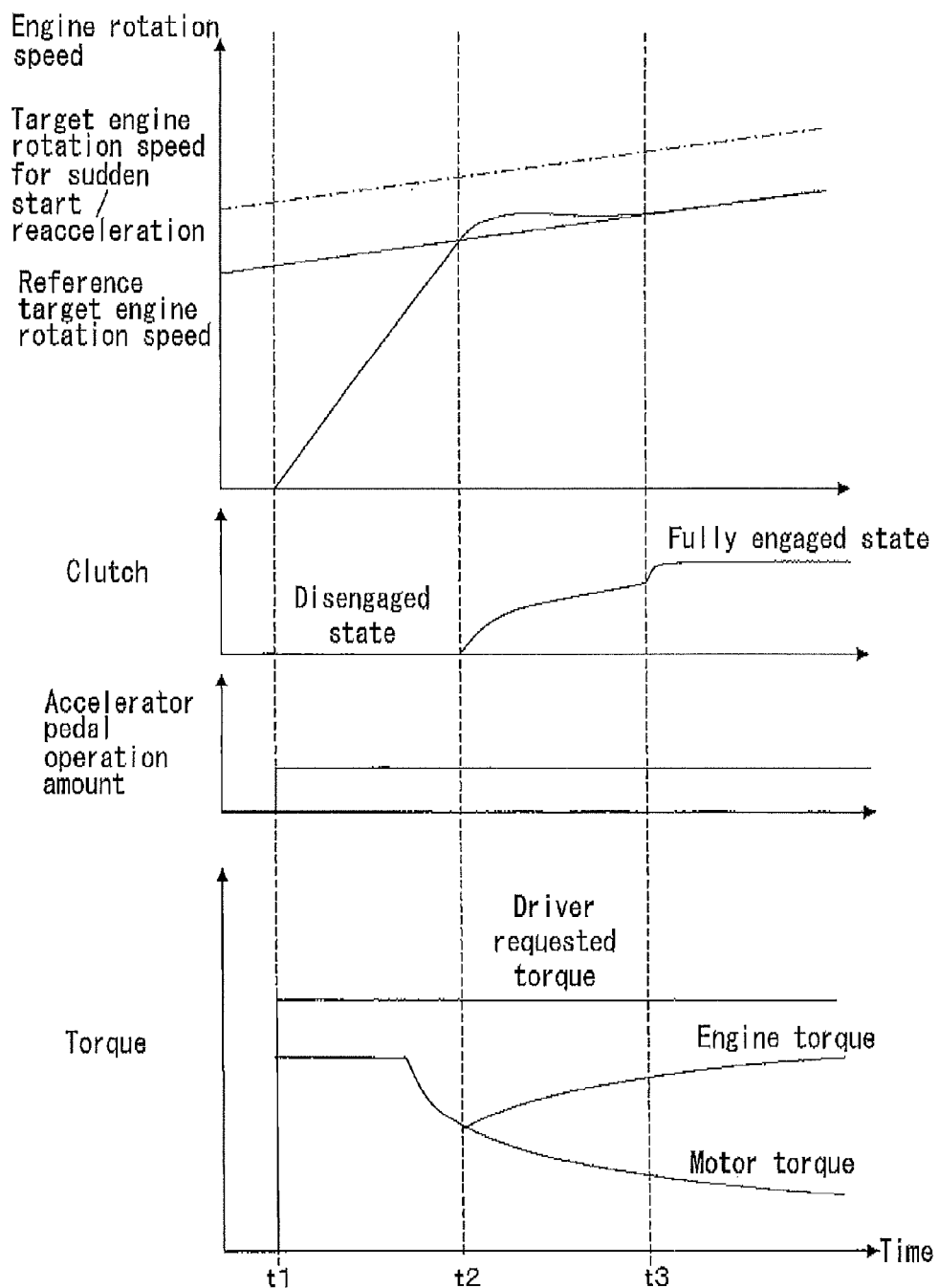
FIG. 10 shows a time chart showing an example of a temporal change of a control according the embodiment disclosed here.

An example of a control executed based on the flowchart shown in FIGS. 5A and 5B will be explained with reference to FIG. 10. A case where the vehicle in a stopped state suddenly starts will be explained. In a case where the vehicle in a stopped state suddenly starts traveling, the clutch 40 is in the disengaged state immediately before the accelerator pedal 11 is operated, and the power is transmissible only between the motor generator 50 and the driving wheels 91 because the clutch 40 is in the disengaged state. In FIG. 10, the engine rotation speed, the state of the clutch 40, the accelerator pedal operation amount, and each type of torques including the driver requested torque, the motor torque, and the engine torque are shown from the top to the bottom in FIG. 10 in the mentioned order.

As shown in FIG. 10, when a driver starts stepping on, or operating the accelerator pedal 11 at time t1, the HV-ECU 65 performs the torque control of the motor generator 50 (motor torque control) (Step 118) and performs the rotation speed control of the engine 20 (Steps 122 to 128) because the driver requested torque exceeds the maximum motor torque.

From the start of the application of the accelerator pedal 11 until the actual rotation speed of the engine 20 exceeds the reference target engine rotation speed (i.e., from time t1 to time t2), the HV-ECU 65 performs the torque control of the motor generator 50 (Step 118) and performs the rotation speed control of the engine 20 (Steps 112 to 128). During this period, the clutch 40 is in the disengaged state, and thus the output torque of the engine 20 (i.e., the torque for contributing to propel, or drive the vehicle) is zero (0). That is, the vehicle is driven only by the drive force by the motor generator 50.

At time t2, when the actual rotation speed of the engine 20 exceeds the reference target engine rotation speed, the control modes of the engine 20 is switched from the rotation speed control to the torque control (Steps 132, 134) and the engagement control of the clutch 40 (Steps 140 to 144) is executed.

The torque control (i.e., engine torque control) of the engine 20 continues until the torque control (I.e., engine torque control) is assumed to be unnecessary (e.g., until the vehicle drive modes is changed from the hybrid drive mode to the motor drive mode). The torque control of the motor generator 50 continues until the torque control is assumed to be unnecessary (e.g., until the drive mode determination means (Step 102) determines that the vehicle is not in the drive mode allowing vehicle drive only by motor).

Further, the engagement control of the clutch 40 continues until the clutch 40 is fully engaged (i.e., fully engaged state) at time t3. During the period from time t2 to time t3, by the engagement of the clutch 40 in the disengaged state, a curve of the engine rotation speed corresponding to a portion exceeding the reference target engine rotation speed can be converged (i.e., the engine rotation speed corresponding to a level exceeding the reference target engine rotation speed can be converged, or absorbed). After time t2, the vehicle is driven by the drive force of the motor generator 50 and the engine 20.

As explained above, according to the embodiment, the engine torque necessity determination means (Step 108) determines whether the engine torque of the engine 20 which is not outputted at the moment is required in addition to the motor torque of the motor generator 50 when the accelerator pedal 11 is operated. Further, during the accelerator pedal 11 is operated, or stepped on, the motor torque control means (Step 118) controls the motor generator 50 so that the motor torque of the motor generator 50 is assumed to be the target torque. On the other hand, when the engine torque necessity determination means (Step 108) determines that the engine torque is necessary in addition to the motor torque, the engine rotation speed control means (Steps 122 to 128) starts the engine 20 and controls the engine 20 so that the actual rotation speed of the output shaft 21 of the engine 20 is assumed to be the target engine rotation speed for sudden start/re-acceleration set to be a value greater than the reference target engine rotation speed by the predetermined value α while maintaining the disengaged state of the clutch 40 from the start of the engine until the actual rotation speed of the output shaft 21 of the engine 20 exceeds the reference target engine rotation speed. Further, after the actual rotation speed of the output shaft 21 of the engine 20 exceeds the reference target engine rotation speed, the clutch engagement control means (Steps 140 to 144) changes the states of the clutch 40 from the disengaged state to the engaged state, and the engine torque control means (Steps 132, 134) cancels the control by the engine rotation speed control means (Steps 122 to 128) so that the engine torque of the engine 20 is assumed to be the target torque.

Thus, when changing the drive modes from the mode in which the clutch 40 is in the disengaged state and the engine torque is not transmitted to the driving wheels 91 (i.e., the mode in which the clutch is in the disengaged state and the power is transmissible only between the motor generator and the driving wheels) to the mode in which the drive force from the motor generator and the driving wheels is transmitted to the driving wheels (hybrid drive mode), the engine 20 in the stopped state is started and the engine rotation speed can be increased at a relatively early stage (in a relatively short period) before the engine rotation speed exceeds the reference target engine rotation speed (from time t1 to time t2 in FIG. 10). Then, after the engine rotation speed exceeds the reference target engine rotation speed (after time t2), because the engagement control of the clutch 40 starts (at time t2) in order to engage the clutch 40 (to establish the engaged state of the clutch 40) which is in the disengaged state, the curve of the engine rotation speed corresponding to the portion exceeding the reference target engine rotation speed (see FIG. 10) is converged by the engagement of the clutch 40. In addition to that, because the engine control is switched from the rotation speed control to the torque control (engine torque control) and the torque control of the motor generator 50 is performed so that the motor torque of the motor generator 50 is assumed to be the target torque, both of the motor control and the engine control can be appropriately performed when the vehicle is in the hybrid drive mode. Accordingly, even when the hybrid vehicle suddenly starts or reaccelerates in response to the driver's request, the vehicle can start or can be accelerated with high responsivity in response to the driver's operation.

Further, the control device for the hybrid vehicle includes the drive mode determination means (Step 102) which determines whether the vehicle is in the drive mode allowing vehicle drive only by motor, which is the mode in which the clutch 40 is in the disengaged state and the power is transmissible only between the motor generator 50 and the driving wheels 91, and the engine torque necessity determination means (Step 108) determines whether the supply of the engine torque of the engine 20 is necessary (in addition to the motor torque) in a case where the drive mode determination means (Step 102) determines that the vehicle is in the drive mode allowing vehicle drive only by motor. Accordingly, the determination whether the supply of the engine torque of the engine 20 is necessary (in addition to the motor torque) can be performed appropriately in accordance with the vehicle states while recognizing the state of the vehicle properly.

The control device for the hybrid vehicle further includes the automated transmission input shaft rotation speed detection sensor 37 (rotation speed sensor 37) for detecting the rotation speed of the input shaft 31 of the automated transmission 30, and the reference target engine rotation speed according to the engine rotation speed control means (Steps 122 to 128) is set to be the greater one of the target engine rotation speed obtained from the operation amount of the accelerator pedal 11 detected by the accelerator pedal position sensor 71 and the target engine rotation speed obtained from the rotation speed of the input shaft 31 of the automated transmission 30 detected by the automated transmission input shaft rotation speed detection sensor 37 (rotation speed sensor 37). Thus, by appropriately controlling the engine rotation speed in accordance with the vehicle drive state before the engine rotation speed exceeds the reference target engine rotation speed, the vehicle drive mode can be transited to the mode for transmitting the drive force from both of the motor generator 50 and the engine 20 to the driving wheels 91 (hybrid drive mode) in the earlier stage, or in a short period.

Further, the predetermined value α according to the engine rotation speed control means (Steps 122 to 128) is set based on the stepped amount, or operation amount of the accelerator pedal 11. Thus, before the engine rotation speed exceeds the reference target engine rotation speed, by properly and appropriately controlling the engine rotation speed in accordance with the drive state of the vehicle, the vehicle drive modes can be transited to the mode for transmitting the drive force from both of the motor generator 50 and the engine 20 to the driving wheels 91 (hybrid drive mode) at the earlier stage, or in a short period.

According to the construction of the embodiment, the control device for a hybrid vehicle includes the automated transmission (30) including the input shaft (31) configured to be rotated by an engine torque outputted from the engine (20) mounted to a vehicle, and the output shaft (32) rotatably connected to the driving wheel (91) of the vehicle for changing a rotation speed of the input shaft (31) based on a gear ratio of plural gears for plural gear stages to transmit a rotation of the input shaft (31) to the driving wheel (91), the clutch (40) configured to engage and disengage the output shaft (21) of the engine (20) and the input shaft (31) of the automated transmission (30) at which an engaged state and a disengaged state are switched by an operation of the clutch actuator (48), the motor (motor generator 50) rotatably connected to the input shaft (31) or the output shaft (32) of the automated transmission (30) for outputting a motor torque to the input shaft (31) or the output shaft (32) of the automated transmission (30), the accelerator pedal position sensor (71) for detecting an operation amount of the accelerator pedal (11), an engine output shaft rotation speed detection sensor (engine rotation speed sensor 22) for detecting a rotation speed of the output shaft (21) of the engine (20), the engine torque necessity determination portion (engine torque necessity determination means) determining whether an engine torque of the engine (20) which is not outputted is necessary in addition to a motor torque of the motor (motor generator 50) when the accelerator pedal (11) is operated, the motor torque control portion (the motor torque control means) controlling the motor (50) so that the motor torque of the motor (50) is assumed to be a target torque during the accelerator pedal (11) is operated, the engine rotation speed control portion (engine rotation speed control means) controlling the engine (20) so that a rotation speed of the output shaft (21) of the engine (20) is assumed to be a target engine rotation speed for sudden start/reacceleration which is set to be a value greater than a reference target engine rotation speed by a predetermined value while maintaining the clutch (40) in the disengaged state after starting the engine (20) and before an actual rotation speed of the output shaft (21) of the engine (20) exceeds the reference target engine rotation speed in a case where the engine torque necessity determination portion determines that the engine torque is necessary in addition to the motor torque, the clutch engagement control portion (clutch engagement control means) changing a state of the clutch (40) from the disengaged state to the engaged state after the actual rotation speed of the output shaft (21) of the engine (20) exceeds the reference target engine rotation speed, and the engine torque control portion (engine torque control means) controlling the engine (20) so that the engine torque of the engine (20) is assumed to be a target torque by canceling the control by the engine rotation speed control portion after the actual rotation speed of the output shaft (21) of the engine (20) exceeds the reference target engine rotation speed.

According to the construction of the disclosure, the engine torque necessity determination portion determines whether the engine torque of the engine (20) which is not outputted is necessary in addition to the motor torque of the motor (motor generator 50) when the accelerator pedal (11) is operated. Further, the motor torque control portion controls the motor (motor generator 50) so that the motor torque of the motor (motor generator 50) is assumed to be the target torque during the accelerator pedal (11) is operated. On the other hand, when the engine torque necessity determination portion determines that the engine torque is necessary in addition to the motor torque, the engine rotation speed control portion starts the engine (20) and controls the engine (20) so that the rotation speed of the output shaft (21) of the engine (20) is assumed to be the target engine rotation speed for sudden start/reacceleration which is set at the value greater than the reference target engine rotation speed by the predetermined value while maintaining the disengaged state of the clutch (40) after the engine (20) is started and before the actual rotation speed of the output shaft (21) of the engine (20) exceeds the reference target engine rotation speed. Further, after the actual rotation speed of the output shaft (21) of the engine (20) exceeds the reference target engine rotation speed, the clutch engagement control portion changes the state of the clutch (40) from the disengaged state to the engaged state, and the engine torque control portion cancels the control by the engine rotation speed control portion to control the engine (20) so that the engine torque of the engine (20) is assumed to be the target torque.

Accordingly, when changing modes from a mode in which the clutch (40) is disengaged and the engine torque is not transmitted to the driving wheel (91) (the mode in which the clutch (40) is disengaged and the power is transmissible only between the motor (motor generator 50) and the driving wheel (91)) to a mode in which the drive force is transmitted to the driving wheel (91) from the motor (motor generator 50) and the engine (20) (hybrid drive mode), the engine in the stopped state is started, and the engine rotation speed can be incremented relatively early (in a short period) before the engine rotation speed exceeds the reference target engine rotation speed. After the engine rotation speed exceeds the reference target engine rotation speed, because the clutch engagement control in order to engage the clutch (40) which is in the disengaged state is started, the engine rotation speed corresponding to a level exceeding the reference target engine rotation speed can be converged, or absorbed. In addition to that, because the engine control is switched from the rotation speed control to the torque control and the torque control of the motor (motor generator 50) is performed so that the motor torque is assumed to be the target torque, the motor control and the engine control can be performed appropriately at the hybrid drive mode. Thus, even when the hybrid vehicle starts suddenly or reaccelerates in response to the driver's request, the vehicle can be started or accelerated with high responsivity in response to the driver's operation.

According to the embodiment, the control device for the hybrid vehicle includes the drive mode determination portion (drive mode determination means) determining whether the vehicle is in a drive mode allowing vehicle drive only by motor in which the clutch (40) is in the disengaged state and a power is transmissible only between the motor (motor generator 50) and the driving wheel (91). The engine torque necessity determination portion determines whether the engine torque of the engine (20) is necessary in addition to the motor torque when the drive mode determination portion determines that the vehicle is in the drive mode allowing vehicle drive only by motor.

The construction of the disclosure includes the drive mode determination portion for determining whether the vehicle is in the drive mode allowing vehicle drive only by motor in which the clutch (40) is in the disengaged state and the power is transmissible only between the motor (motor generator 50) and the driving wheel (91), and when the drive mode determination portion determines that the vehicle is in the drive mode allowing vehicle drive only by motor, engine torque necessity determination portion determines whether the engine torque of the engine (20) is necessary in addition to the motor torque. Accordingly, the determination whether the engine torque of the engine (20) is necessary in addition to the motor torque can be appropriately and properly performed in accordance with the vehicle state while appropriately recognizing the vehicle state.

According to the construction of the embodiment, the control device for the hybrid vehicle includes the automated transmission input shaft rotation speed detection sensor (rotation speed sensor 37) detecting a rotation speed of the input shaft (31) of the automated transmission (30). The reference target engine rotation speed according to the engine rotation speed control portion is set to be a greater one of a target engine rotation speed obtained based on the operation amount of the accelerator pedal (11) detected by the accelerator pedal position sensor (71) and a target engine rotation speed obtained based on the rotation speed of the input shaft (31) of the automated transmission (30) detected by the automated transmission input shaft rotation speed detection sensor (rotation speed sensor 37).

The construction of the disclosure includes the automated transmission input shaft rotation speed detection sensor (rotation speed sensor 37) detecting the rotation speed of the input shaft of the automated transmission (30), and the reference target engine rotation speed according to the engine rotation speed control portion is set to be the greater one of the target engine rotation speed obtained from the operation amount of the accelerator pedal (11) detected by the accelerator pedal position sensor (71) or the target engine rotation speed obtained from the rotation speed of the input shaft (31) of the automated transmission (30) detected by the automated transmission input shaft rotation speed detection sensor (rotation speed sensor 37). Thus, before the engine rotation speed exceeds the reference target engine rotation speed, by appropriately and properly controlling the engine rotation in response to the vehicle drive state, the vehicle drive mode can be changed to the mode in which the drive force from both of the motor (motor generator 50) and the engine (20) is transmitted to the driving wheel (91) (hybrid drive mode) at the early stage, or in a short time.

According to the construction of the embodiment, the predetermined value in association with the engine rotation speed control portion is set based on the operation amount of the accelerator pedal (11).

According to the construction of the disclosure, the predetermined value in association with the engine rotation speed control portion is set on the basis of the operation amount of the accelerator pedal (11). Thus, by appropriately and properly controlling the engine rotation in accordance with the vehicle drive state before the engine rotation speed exceeds the reference target engine rotation speed, the vehicle drive mode can be changed to the mode in which the drive force from both of the motor (motor generator 50) and the engine (20) is transmitted to the driving wheel (91) (hybrid drive mode) at the early stage, or in a short period.

According to the construction of the embodiment, a driver requested torque being proportional to the operation amount of the accelerator pedal (11) detected by the accelerator pedal position sensor (71) is calculated and whether the driver requested torque is equal to or greater than a maximum motor torque is determined, and wherein a greater one of a target engine rotation speed based on the operation amount of the accelerator pedal and a target engine rotation speed based on the rotation speed of the input shaft of the automated transmission is obtained as the reference target engine rotation speed when the driver requested torque is equal to or greater than the maximum motor torque.

According to the construction of the embodiment, an engine rotation speed control for performing a feedback control is performed so that the actual rotation speed of the output shaft (21) of the engine (20) is assumed to be the target engine rotation speed for sudden start/reacceleration which is greater than the reference target engine rotation speed by the predetermined value.

According to the construction of the embodiment, the target engine rotation speed is obtained from a map in which the target engine rotation speed corresponds to a first target engine rotation speed (Ne1) which is constant in a range from a state where the accelerator pedal is not operated to the operation amount of the accelerator pedal is assumed to be a first accelerator pedal operation amount (A1), corresponds to a second target engine rotation speed (Ne2) which is higher than the first target engine rotation speed (Ne1) and is constant in a range from the first accelerator pedal operation amount (A1) to a second accelerator pedal operation amount (A2) which is greater than the first accelerator pedal operation amount (A1), and gradually increases from the second target engine rotation speed (Ne2) to a third target engine rotation speed (Ne3) in a range from the second accelerator pedal operation amount (A2) to a third accelerator pedal operation amount (A3) which is greater than the second accelerator pedal operation amount (A2).

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A control device for a hybrid vehicle, comprising:
   an automated transmission including an input shaft configured to be rotated by an engine torque outputted from an engine mounted to a vehicle, and an output shaft rotatably connected to a driving wheel of the vehicle for changing a rotation speed of the input shaft based on a gear ratio of plural gears for plural gear stages to transmit a rotation of the input shaft to the driving wheel;
   a clutch configured to engage and disengage an output shaft of the engine and the input shaft of the automated transmission at which an engaged state and a disengaged state are switched by an operation of a clutch actuator;
   a motor rotatably connected to the input shaft or the output shaft of the automated transmission for outputting a motor torque to the input shaft or the output shaft of the automated transmission;
   an accelerator pedal position sensor for detecting an operation amount or an accelerator pedal;
   an engine output shaft rotation speed detection sensor for detecting a rotation speed of the output shaft of the engine;
   an engine torque necessity determination portion determining whether an engine torque of the engine which is not outputted is necessary in addition to a motor torque of the motor when the accelerator pedal is operated;
   a motor torque control portion controlling the motor so that the motor torque of the motor is assumed to be a target torque during the accelerator pedal is operated;
   an engine rotation speed control portion controlling the engine so that a rotation speed of the output shaft of the engine is assumed to be a target engine rotation speed for sudden start/reacceleration which is set to be a value greater than a reference target engine rotation speed by a predetermined value while maintaining the clutch in the disengaged state after starting the engine and before an actual rotation speed of the output shaft of the engine exceeds the reference target engine rotation speed in a case where the engine torque necessity determination portion determines that the engine torque is necessary in addition to the motor torque;
   a clutch engagement control portion changing a state of the clutch from the disengaged state to the engaged state after the actual rotation speed of the output shaft of the engine exceeds the reference target engine rotation speed; and
   an engine torque control portion controlling the engine so that the engine torque of the engine is assumed to be a target torque by canceling the control by the engine rotation speed control portion so that the rotation speed of the output shaft of the engine is assumed to be the target engine rotation speed for sudden start/reacceleration after the actual rotation speed of the output shaft of the engine exceeds the reference target engine rotation speed.

2. The control device for the hybrid vehicle according to claim 1, further comprising:
   a drive mode determination portion determining whether the vehicle is in a drive mode allowing vehicle drive only by motor in which the clutch is in the disengaged state and a power is transmissible only between the motor and the driving wheel; wherein
   the engine torque necessity determination portion determines whether the engine torque of the engine is necessary in addition to the motor torque when the drive mode determination portion determines that the vehicle is in the drive mode allowing vehicle drive only by motor.

3. The control device for the hybrid vehicle according to claim 1, further comprising:
   an automated transmission input shaft rotation speed detection sensor detecting a rotation speed of the input shaft of the automated transmission; wherein
   the reference target engine rotation speed according to the engine rotation speed control portion is set to be a greater one of a target engine rotation speed obtained based on the operation amount of the accelerator pedal detected by the accelerator pedal position sensor and a target engine rotation speed obtained based on the rotation speed of the input shaft of the automated transmission detected by the automated transmission input shaft rotation speed detection sensor.

4. The control device for the hybrid vehicle according to claim 1, wherein the predetermined value in association with the engine rotation speed control portion is set based on the operation amount of the accelerator pedal.

5. The control device for the hybrid vehicle according to claim 1, wherein a driver requested torque being proportional to the operation amount of the accelerator pedal detected by the accelerator pedal position sensor is calculated and whether the driver requested torque is equal to or greater than a maximum motor torque is determined, and wherein a greater one of a target engine rotation speed based on the operation amount of the accelerator pedal and a target engine rotation speed based on the rotation speed of the input shaft of the automated transmission is obtained as the reference target engine rotation speed when the driver requested torque is equal to or greater than the maximum motor torque.

6. The control device for the hybrid vehicle according to claim 1, wherein an engine rotation speed control for performing a feedback control is performed so that the actual rotation speed of the output shaft of the engine is assumed to be the target engine rotation speed for sudden start/reacceleration which is greater than the reference target engine rotation speed by the predetermined value.

7. The control device for the hybrid vehicle according to claim 1, wherein the target engine rotation speed is obtained from a map in which the target engine rotation speed corresponds to a first target engine rotation speed which is constant in a range from a state where the accelerator pedal is not operated to the operation amount of the accelerator pedal is assumed to be a first accelerator pedal operation amount, corresponds to a second target engine rotation speed which is higher than the first target engine rotation speed and is constant in a range from the first accelerator pedal operation amount to a second accelerator pedal operation amount which is greater than the first accelerator pedal operation amount, and gradually increases from the second target engine rotation speed to a third target engine rotation speed in a range from the second accelerator pedal operation amount to a third accelerator pedal operation amount which is greater than the second accelerator pedal operation amount.

\* \* \* \* \*